US012080126B2

United States Patent
Kramer

(10) Patent No.: US 12,080,126 B2
(45) Date of Patent: Sep. 3, 2024

(54) METHOD AND PHYSICAL SYSTEM FOR REFORMULATING COIN OPERATED AMUSEMENT DEVICES INTO A DEEPLY REGULATED CASINO CASH-BASED REWARDS ENVIRONMENT

(71) Applicant: Glenn Kramer, Merritt Island, FL (US)

(72) Inventor: Glenn Kramer, Merritt Island, FL (US)

( * ) Notice: Subject to any disclaimer, the term of this patent is extended or adjusted under 35 U.S.C. 154(b) by 666 days.

(21) Appl. No.: 17/169,617

(22) Filed: Feb. 8, 2021

(65) Prior Publication Data
US 2021/0248870 A1 Aug. 12, 2021

Related U.S. Application Data

(60) Provisional application No. 62/971,169, filed on Feb. 6, 2020, provisional application No. 62/971,164, filed on Feb. 6, 2020.

(51) Int. Cl.
| | |
|---|---|
| *G07F 17/32* | (2006.01) |
| *G06F 21/60* | (2013.01) |
| *G06Q 20/02* | (2012.01) |
| *G06Q 20/20* | (2012.01) |
| *G06Q 20/32* | (2012.01) |
| *G06Q 50/26* | (2012.01) |
| *G06Q 50/34* | (2012.01) |
| *G07F 7/04* | (2006.01) |

(52) U.S. Cl.
CPC ........ *G07F 17/3246* (2013.01); *G06F 21/602* (2013.01); *G06Q 20/02* (2013.01); *G06Q 20/204* (2013.01); *G06Q 20/3278* (2013.01); *G06Q 50/26* (2013.01); *G06Q 50/34* (2013.01); *G07F 7/04* (2013.01); *G06Q 2220/00* (2013.01)

(58) Field of Classification Search
CPC .. G07F 17/32; G07F 17/3244; G07F 17/3253; G07F 17/3262
See application file for complete search history.

(56) References Cited

U.S. PATENT DOCUMENTS

| | | | | |
|---|---|---|---|---|
| 2004/0048658 A1* | 3/2004 | Sanders | ................. | G07F 17/32 463/25 |
| 2004/0204231 A1* | 10/2004 | Martin | ..................... | G07F 17/32 463/25 |
| 2018/0137718 A1* | 5/2018 | Smart | ................. | G07F 17/3253 |

* cited by examiner

*Primary Examiner* — James S. McClellan
(74) *Attorney, Agent, or Firm* — White-Welker & Welker, LLC; Matthew T. Welker, Esq.

(57) ABSTRACT

System allowing the use of more traditional Coin Operated Amusement Devices (COADs) into a deeply regulated a casino environment. Software monitors each individual game's performance allowing its computer player data to be reformulated for use in a cash-based rewards casino environment. Each COAD is outfitted with a Control Device (CD) that operates independently from the COAD to recalculate an amusement/redemption machines ticket/prize rewards and reformulate the existing rewards data into a cash-based reward meeting specific regulatory mandated requirements. The CD will receive all patron monetary, play and win data thru any one of the COADs analog, RS 232, MDB, CCTalk port configurations and reprocess that data in digital format resulting in a cash-based reward. The CD device will independently communicate each COAD's player results directly to the server(s) as well as simultaneously allowing the processing and recalculation of all monetary transactions between the player and the COAD.

1 Claim, 4 Drawing Sheets

METHOD AND PHYSICAL SYSTEM FOR REFORMULATING COIN OPERATED AMUSEMENT DEVICES INTO A DEEPLY REGULATED CASINO CASH-BASED REWARDS ENVIRONMENT

SEQUENCE LISTING OR PROGRAM

Not Applicable

TECHNICAL FIELD OF THE INVENTION

The present invention relates generally to coin operated amusement devices. More specifically, the present invention relates to coin operated amusement devices featuring an electronic circuit board controller to provide remote, wireless, machine monitoring which have been reformulated into providing cash-based rewards for use in a deeply regulated casino environment.

BACKGROUND OF THE INVENTION

Historically, coin operated amusement devices fall into many categories. The Coin op industry as a whole got its start with the evolution of the pinball machine. Furthering in time and technology was the creation of the video game which opened the door to the coin op 'arcade' facility.

As time and technology grew, the first instant win machines were born from the first iterations of the prize grabbing 'Crane' machines. Furthering the industry's evolution was the introduction of Skill based redemption games which furthered the industry's dynamic into an entirely new experience more commonly referred today as an FEC (Family Entertainment Center).

Location-based entertainment (LBE), such as Casinos, is about bringing people together, in real life, to share experiences. Arcades, water parks, and family entertainment centers—built by baby boomers and Gen X—gave millennials great childhood memories and a particular fondness for LBE. However during their youths, this focus was quietly overshadowed by the advent of the internet, and the scramble to secure smooth, online experiences caused innovation in LBE to stall.

Now, as the novelty of online experiences starts to wear down, millennials want to go back and recreate those childhood memories in grown-up, more immersive and tech-enhanced versions. Traditional occupants of brick-and-mortar retail continue to move into online distribution, opening up more and more real estate. At the same time, technology becomes even more accessible, creating perfect conditions for innovation in the LBE market.

This business model known as an FEC has taken the millennial population by storm moving adult players away from the traditional 'Casino' to a model which is based on games of skill rather than games of chance. This rapid popularity in Skill based amusement gaming has left the casino industry in peril with no other choice but to move into a skill based gaming model.

According to new research from Mintel on family leisure preferences, Millennial (aged 18-35 in 2012) moms and dads have family entertainment spending habits that contrast with their older counterparts. While 42% of parents surveyed are spending less on family entertainment now than they were a year ago, more than one-third of Millennials are spending more, compared to just 17% of non-Millennial parents.

Definitions

Gateway, Hub—a device, including an antenna, that enables two-way remote communication between one or more devices, a network server, and a smartphone app.

Network Server—servers that route messages from Gateways to a smartphone app, and back.

Application—a piece of software, running on a server.

COAD is defined as, including but not limited to, a "coin operated amusement device" or coin-operated amusements include video games, pinball machines, jukeboxes, pool tables, slot machines, and other machines and gaming devices operated by coins or tokens inserted into the machines by individual users.

IP (or "Ingress Protection") ratings are defined in international standard EN 60529 (British BS EN 60529:1992, European IEC 60509:1989). They are used to define levels of sealing effectiveness of electrical enclosures against intrusion from foreign bodies (tools, dirt etc.) and moisture.

Artificial intelligence (AI) is the simulation of human intelligence processes by machines, especially computer systems. These processes include learning (the acquisition of information and rules for using the information), reasoning (using rules to reach approximate or definite conclusions) and self-correction.

The Global Positioning System (GPS) is a space-based navigation system that provides location and time information in all weather conditions, anywhere on or near the earth where there is an unobstructed line of sight to four or more GPS satellites. The system provides critical capabilities to military, civil, and commercial users around the world. The United States government created the system, maintains it, and makes it freely accessible to anyone with a GPS receiver.

"Application software" is a set of one or more programs designed to carry out operations for a specific application. Application software cannot run on itself but is dependent on system software to execute. Examples of application software include MS Word, MS Excel, a console game, a library management system, a spreadsheet system etc. The term is used to distinguish such software from another type of computer program referred to as system software, which manages and integrates a computer's capabilities but does not directly perform tasks that benefit the user. The system software serves the application, which in turn serves the user.

The term "app" is a shortening of the term "application software". It has become very popular and in 2010 was listed as "Word of the Year" by the American Dialect Society "Apps" are usually available through application distribution platforms, which began appearing in 2008 and are typically operated by the owner of the mobile operating system. Some apps are free, while others must be bought. Usually, they are downloaded from the platform to a target device, but sometimes they can be downloaded to laptops or desktop computers.

"API" In computer programming, an application programming interface (API) is a set of routines, protocols, and tools for building software applications. An API expresses a software component in terms of its operations, inputs, outputs, and underlying types. An API defines functionalities that are independent of their respective implementations, which allows definitions and implementations to vary without compromising each other.

BLUETOOTH is a wireless technology standard for exchanging data over short distances (using short-wavelength UHF radio waves in the ISM band from 2.4 to 2.485 GHz) from fixed and mobile devices and building personal area networks (PANs).

BLUETOOTH low energy (Bluetooth LE, BLE, marketed as BLUETOOTH SMART) is a wireless personal area network technology designed and marketed by the Bluetooth Special Interest Group aimed at novel applications in the healthcare, fitness, beacons, security, and home entertainment industries.

A client is a piece of computer hardware or software that accesses a service made available by a server. The server is often (but not always) on another computer system, in which case the client accesses the service by way of a network. The term applies to programs or devices that are part of a client-server model.

Cloud computing is the on-demand availability of computer system resources, especially data storage and computing power, without direct active management by the user. The term is generally used to describe data centers available to many users over the Internet. Large clouds, predominant today, often have functions distributed over multiple locations from central servers. If the connection to the user is relatively close, it may be designated an edge server. Clouds may be limited to a single organization (enterprise clouds), be available to many organizations (public cloud), or a combination of both (hybrid cloud).

"Electronic Mobile Device" is defined as any computer, phone, smartphone, tablet, or computing device that is comprised of a battery, display, circuit board, and processor that is capable of processing or executing software. Examples of electronic mobile devices are smartphones, laptop computers, and table PCs.

Family/indoor entertainment centers (FECs) are small amusement parks or entertainment zones that typically serve local communities in big and small cities. FEC's are designed to keep the entire family engaged, generally at a significantly less per-person cost than a traditional amusement park. It offers varied amusement options such as arcades, gaming consoles, video games, soft play areas, indoor playground systems, redemption machines, children's rides, skill-based machine games, and games based on virtual and augmented reality. FECs also host private celebrations such as birthday parties and corporate events as well as they are attractively located in areas such as malls, where customers often visit.

The Gaming Standards Association (GSA) is an international trade association that creates benefits for gaming manufacturers, suppliers, operators and regulators.

A gateway is a link between two computer programs or systems such as Internet Forums. A gateway acts as a portal between two programs allowing them to share information by communicating between protocols on a computer or between dissimilar computers.

"GUI". In computing, a graphical user interface (GUI) sometimes pronounced "gooey" (or "gee-you-eye")) is a type of interface that allows users to interact with electronic devices through graphical icons and visual indicators such as secondary notation, as opposed to text-based interfaces, typed command labels or text navigation. GUIs were introduced in reaction to the perceived steep learning curve of command-line interfaces (CLIs), which require commands to be typed on the keyboard.

The Hypertext Transfer Protocol (HTTP) is an application protocol for distributed, collaborative, hypermedia information systems. HTTP is the foundation of data communication for the World Wide Web. Hypertext is structured text that uses logical links (hyperlinks) between nodes containing text. HTTP is the protocol to exchange or transfer hypertext.

The internet of things, or IoT, is a system of interrelated computing devices, mechanical and digital machines, objects, animals or people that are provided with unique identifiers (UIDs) and the ability to transfer data over a network without requiring human-to-human or human-to-computer interaction.

The Internet Protocol (IP) is the principal communications protocol in the Internet protocol suite for relaying datagrams across network boundaries. Its routing function enables internetworking, and essentially establishes the Internet.

An Internet Protocol address (IP address) is a numerical label assigned to each device (e.g., computer, printer) participating in a computer network that uses the Internet Protocol for communication. An IP address serves two principal functions: host or network interface identification and location addressing.

An Internet service provider (ISP) is an organization that provides services for accessing, using, or participating in the Internet.

iOS (originally iPhone OS) is a mobile operating system created and developed by Apple Inc. and distributed exclusively for Apple hardware. It is the operating system that presently powers many of the company's mobile devices, including the iPhone, iPad, and iPod touch.

The term location-based entertainment (LBE) is most generally used to describe any form of entertainment which takes place in a specific location outside of the user's home—often in a Family Entertainment Center.

Machine learning (ML) is the scientific study of algorithms and statistical models that computer systems use in order to perform a specific task effectively without using explicit instructions, relying on patterns and inference instead. It is seen as a subset of artificial intelligence. Machine learning algorithms build a mathematical model based on sample data, known as "training data", in order to make predictions or decisions without being explicitly programmed to perform the task.

"Millennials", also known as Generation Y (or simply Gen Y), are the demographic cohort following Generation X and preceding Generation Z. Researchers and popular media use the early 1980s as starting birth years and the mid-1990s to early 2000s as ending birth years, with 1981 to 1996 a widely accepted definition.

A "mobile app" is a computer program designed to run on smartphones, tablet computers and other mobile devices, which the Applicant/Inventor refers to generically as "a computing device", which is not intended to be all inclusive of all computers and mobile devices that are capable of executing software applications.

A "mobile device" is a generic term used to refer to a variety of devices that allow people to access data and information from wherever they are. This includes cell phones and other portable devices such as, but not limited to, PDAs, Pads, smartphones, and laptop computers.

A "module" in software is a part of a program. Programs are composed of one or more independently developed modules that are not combined until the program is linked. A single module can contain one or several routines or steps.

A "module" in hardware is a self-contained component.

An operating system (OS) is software that manages computer hardware and software resources and provides common services for computer programs. The operating system is an essential component of the system software in a computer system. Application programs usually require an operating system to function.

Push Notification, Push, or server push describes a style of Internet-based communication where the request for a given transaction is initiated by the publisher or central server. It is contrasted with pull/get, where the request for the transmission of information is initiated by the receiver or client.

Serial Attached SCSI (SAS) is a point-to-point serial protocol that moves data to and from computer-storage devices such as hard drives and tape drives. SAS replaces the older Parallel SCSI (Parallel Small Computer System Interface, usually pronounced "scuzzy" or "sexy") bus technology that first appeared in the mid-1980s. SAS, like its predecessor, uses the standard SCSI command set. SAS offers optional compatibility with Serial ATA (SATA), versions 2 and later. This allows the connection of SATA drives to most SAS backplanes or controllers. The reverse, connecting SAS drives to SATA backplanes, is not possible.

A server is a running instance of an application (software) capable of accepting requests from the client and giving responses accordingly. Servers can run on any computer including dedicated computers, which individually are also often referred to as "the server".

A smart device is an electronic device, generally connected to other devices or networks via different wireless protocols such as Bluetooth, NFC, Wi-Fi, LiFi, 3G, etc., that can operate to some extent interactively and autonomously.

"SMS" (short message service) is a text messaging service component of most telephone, internet, and mobile-device systems. It uses standardized communication protocols to enable mobile devices to exchange short text messages.

A "software application" is a program or group of programs designed for end users. Application software can be divided into two general classes: systems software and applications software. Systems software consists of low-level programs that interact with the computer at a very basic level. This includes operating systems, compilers, and utilities for managing computer resources. In contrast, applications software (also called end-user programs) includes database programs, word processors, and spreadsheets. Figuratively speaking, applications software sits on top of systems software because it is unable to run without the operating system and system utilities.

A "software module" is a file that contains instructions. "Module" implies a single executable file that is only a part of the application, such as a DLL. When referring to an entire program, the terms "application" and "software program" are typically used. A software module is defined as a series of process steps stored in an electronic memory of an electronic device and executed by the processor of an electronic device such as a computer, pad, smart phone, or other equivalent device known in the prior art.

A "software application module" is a program or group of programs designed for end users that contains one or more files that contains instructions to be executed by a computer or other equivalent device.

A "smartphone" (or smart phone) is a mobile phone with more advanced computing capability and connectivity than basic feature phones. Smartphones typically include the features of a phone with those of another popular consumer device, such as a personal digital assistant, a media player, a digital camera, and/or a GPS navigation unit. Later smartphones include all of those plus the features of a touchscreen computer, including web browsing, wideband network radio (e.g. LTE), Wi-Fi, 3rd-party apps, motion sensor and mobile payment.

URL is an abbreviation of Uniform Resource Locator (URL), it is the global address of documents and other resources on the World Wide Web (also referred to as the "Internet").

A "User" is any person registered to use the computer system executing the method of the present invention.

In computing, a "user agent" or "useragent" is software (a software agent) that is acting on behalf of a user. For example, an email reader is a mail user agent, and in the Session Initiation Protocol (SIP), the term user agent refers to both end points of a communications session. In many cases, a user agent acts as a client in a network protocol used in communications within a client-server distributed computing system. In particular, the Hypertext Transfer Protocol (HTTP) identifies the client software originating the request, using a "User-Agent" header, even when the client is not operated by a user. The SIP protocol (based on HTTP) followed this usage.

A "web application" or "web app" is any application software that runs in a web browser and is created in a browser-supported programming language (such as the combination of JavaScript, HTML and CSS) and relies on a web browser to render the application.

A "website", also written as Web site, web site, or simply site, is a collection of related web pages containing images, videos or other digital assets. A website is hosted on at least one web server, accessible via a network such as the Internet or a private local area network through an Internet address known as a Uniform Resource Locator (URL). All publicly accessible websites collectively constitute the World Wide Web.

A "web page", also written as webpage is a document, typically written in plain text interspersed with formatting instructions of Hypertext Markup Language (HTML, XHTML). A web page may incorporate elements from other websites with suitable markup anchors.

Web pages are accessed and transported with the Hypertext Transfer Protocol (HTTP), which may optionally employ encryption (HTTP Secure, HTTPS) to provide security and privacy for the user of the web page content. The user's application, often a web browser displayed on a computer, renders the page content according to its HTML markup instructions onto a display terminal. The pages of a website can usually be accessed from a simple Uniform Resource Locator (URL) called the homepage. The URLs of the pages organize them into a hierarchy, although hyperlinking between them conveys the reader's perceived site structure and guides the reader's navigation of the site.

"Wi-Fi" also spelled Wifi, WiFi, or wifi, is a local area wireless technology that allows an electronic device to exchange data or connect to the internet using 2.4 GHz UHF and 5 GHz SHF radio waves. The name is a trademark name and is a play on the audiophile term Hi-Fi. The Wi-Fi Alliance defines Wi-Fi as any "wireless local area network (WLAN) products that are based on the Institute of Electrical and Electronics Engineers' (IEEE) 802.11 standards".[1] However, since most modern WLANs are based on these standards, the term "Wi-Fi" is used in general English as a synonym for "WLAN". Only Wi-Fi products that complete Wi-Fi Alliance interoperability certification testing successfully may use the "Wi-Fi CERTIFIED" trademark.

SUMMARY OF THE INVENTION

The amusement industries electronic manufacturing standards are quite primitive in comparison to ones utilized in the Casino industry. Most amusement machine manufacturers interface data thru platforms such as Analog, Rs232, MDB and CCTalk. These platforms are not acceptable to the casino industry and that's where the present invention falls into place.

The present invention teaches a hardware and software system that will reprocess an existing amusement/redemption machine's ticket currency and metered financial data and convert it into a secure casino recognized SAS/GSA protocol for use in cash driven prize environment.

Most if not all of the existing amusement equipment manufactured to date have primitive software abilities and are unable to monetize the machines player results. A non-skill game uses a random number generator to determine wins, returns, and payout. Skill based games, vary based on return payout to the player and return to a player meeting the minimum guarantee of the jurisdiction. The addition of the system of the present invention to each game will now supercharge the machines ability to vary the return, recalculate, and analyze play and award the proper cash returns based on a monetization win model, that also conforms to local rules regarding casino machine return percentages.

Additionally, most government agencies will mandate minimum returns to players and the system of the present invention will manage and allow for that necessary government compliance as well as live financial reporting for taxation.

The present invention is a multi-faceted hardware and software system that provides the necessary technology to allow the use of a more traditional 'Coin Operated Amusement Device' (COAD) skill, redemption, or otherwise "into a deeply regulated a casino environment. The software and method taught by the present invention monitors each individual game's performance allowing its computer player data to be reformulated for use in a cash-based rewards casino environment.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

The present invention teaches a multi-faceted hardware and software systems that provide the necessary technology to allow the use of a more traditional 'Coin Operated Amusement Device (COAD) skill, redemption, or otherwise "into a deeply regulated a casino environment. The proprietary software taught by the present invention monitors each individual games performance allowing its computer player data to be reformulated for use in a Cash-based rewards casino environment.

Figure 1:
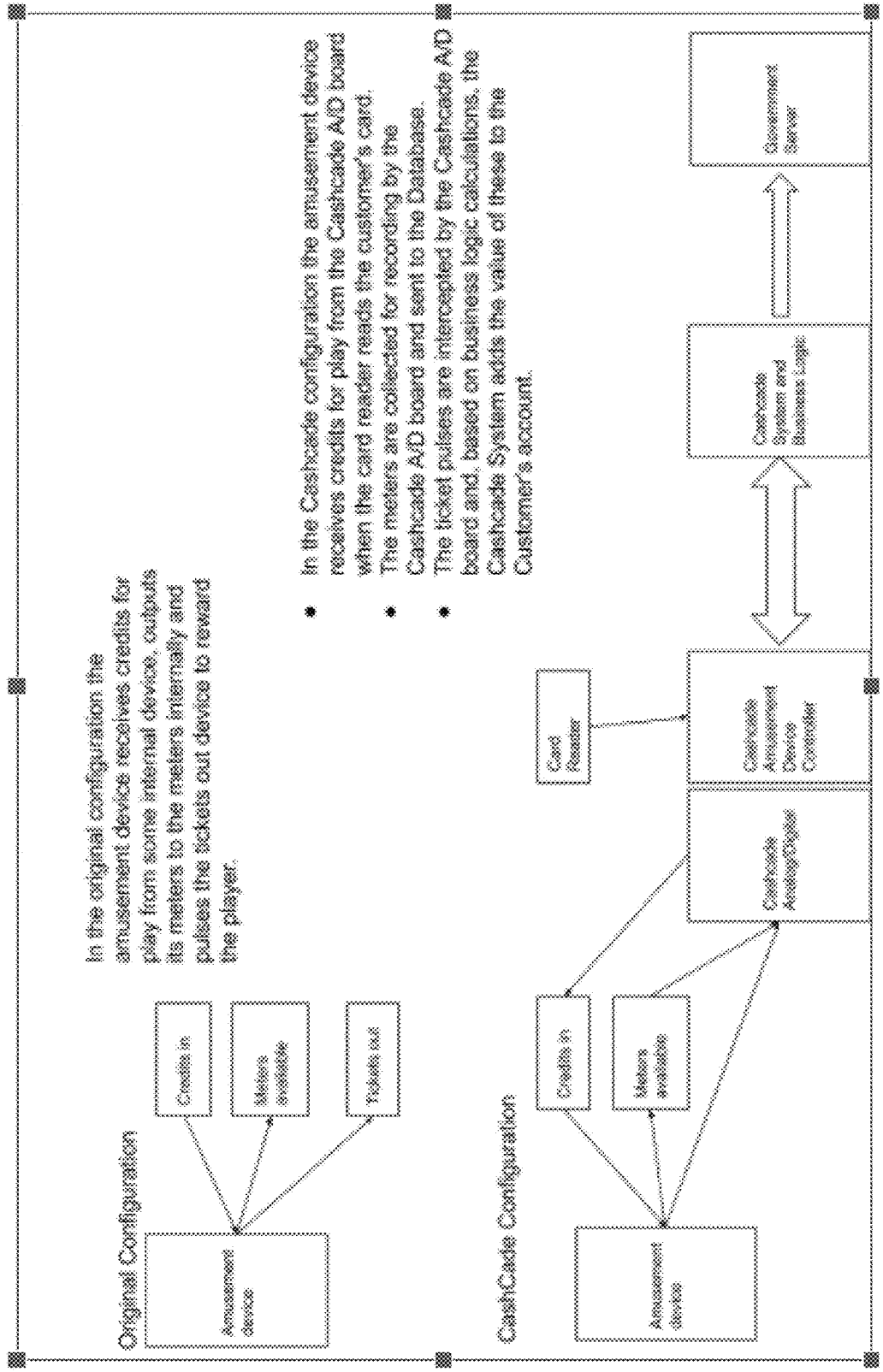
FIG. 1 contains two flow charts, a first flow chart illustrating the original/standard configuration of a standard amusement device and a second flow chart illustrating the configuration of a standard amusement device as modified by the physical apparatus of the present invention and controlled by the software component of the present invention.

FIG. 1 contains two flow charts, a first flow chart illustrating the original/standard configuration of a standard amusement device and a second flow chart illustrating the configuration of a standard amusement device as modified by the physical apparatus of the present invention and controlled by the software component of the present invention.

In the original configuration the amusement device receives credits for play and some internal device, outputs it meters to the meters internally and pulses the tickets out the device to reward the player.

In the configuration taught by the present invention, the amusement device is physically connected to an analog/digital (A/D) board, and a device controller (CD) which can receive and transmit information to and from the A/D board, a card reader, as well as the present inventions system and business logic stored on a remote cloud computer system. The system and business logic stored on a remote cloud computer system can further interact with a remote or local government computer server for compliance and reporting.

In the operation as taught and enabled by the hardware and software process/method of the present invention, the amusement device receives credits for play form an A/D board when the card reader reads a customer's card. The meters are then collected for recording by the A/D board and sent to a database. The ticket pulses are intercepted by the A/D board and, based on business logic calculations, the system adds the value of these to the customer's account in the form of cash credit.

Figure 2:
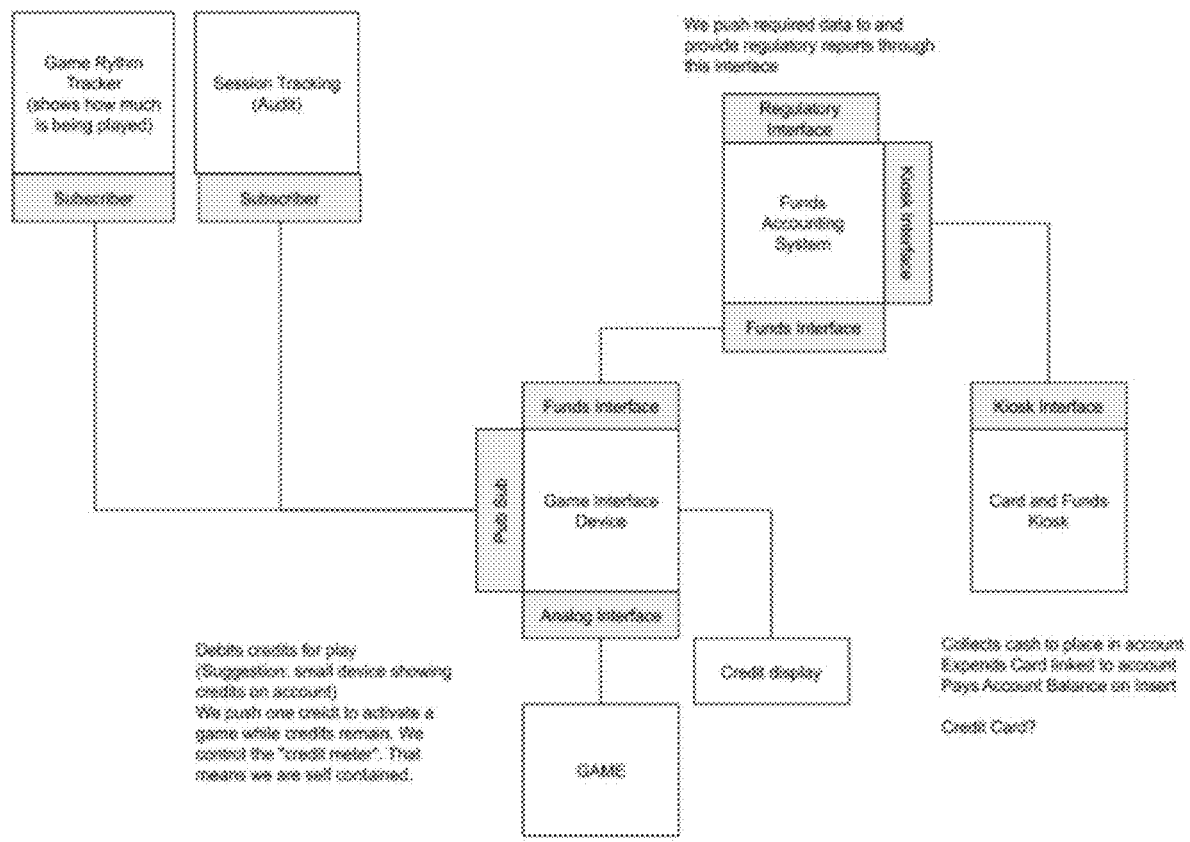
FIG. 2 is a flow chart illustrating the method and process for reformulating coin operated amusement devices into a deeply regulated casino cash-based rewards environment.

FIG. 2 is a flow chart illustrating the method and process for reformulating coin operated amusement devices into a deeply regulated casino cash-based rewards environment. A session tracking (audit) and a game rhythm tracker shows how much is being played to a subscriber/user. The session tracking (audit) and a game rhythm tracker communicate with a game interface.

The game interface device communicates with a funds interface for a funds accounting system, analog interface of the game machine/device, and the subscriber session tracking (audit) and a game rhythm tracker generating a credit display to the user. The game interface debits credits for play, and can provide a small device showing credits on an account or transfer such information to an application of an mobile device. The game interface controls the "credit meter" so that when one credit is pushed to activate game play, the other credits remain such that this device is self-contained.

The funds accounting system communicates with the game interface device, a regulatory interface and a kiosk interface. The system teaches and uses push data to provide regulatory reports through the game interface device. The kiosk interface enables the transmission of subscriber/user information to a kiosk interface delivering card and funds input and output as the kiosk collected cash to place in the account, expends cards linked to an account, and pays account balances based on a cash transaction.

The kiosk displays three displayed options: PURCHASE CARD WITH VALUE; LOAD VALUE ON CARD; and REDEEM CARD VALUE FOR CASH. Additionally the kiosk will respond to: cash being inserted by expending a card after stacking the value of the cash; and a card being inserted by displaying: LOAD VALUE ON CARD or REDEEM CARD VALUE FOR CASH.

In use, when a player without a card approaches the kiosk and presses the "PURCHASE CARD WITH VALUE" option on the screen, the kiosk responds with "INSERT CASH TO OBTAIN CARD WITH VALUE". The customer inserts bills which are stacked and the accumulated value is displayed on the screen. As soon as there is any accumulated value a button appears showing PRODUCE CARD which indicates the customers has finished inserting cash. There is also a timeout period since the last bill was inserted that causes the same condition. At this point the card is produced and the accumulated value is deposited in the account associated with the card.

The account server receives a message from the kiosk that a value has been assigned to a card linked to an account. The account server places the value on the account and acknowledges the message from the kiosk.

Next, the customer approaches the amusement device which contains a "kit" comprising the hardware and software components of the system of the present invention. The system or "kit" is an interface device that has: a network connection to the other parts of the system; a card reader into which the customer can insert the card to access their account; an interface device to the amusement device that activates play (transfers credit); a small display which shows the number of credits available on the account to play this particular amusement device; and a button which will execute the function of removing a game specific amount of credits, cash, and/or cash specific equivalents from the customer's account and placing it on the amusement device in order to allow the amusement device to be played.

When the customer inserts the card into the card device the card reader bezel flashes red for a bad card read or green for a good card read. When the card is read the card number is transmitted via the network device to the account system and the account system will read both the account value and the value of a credit on the amusement device. The number of credits is rounded down to the nearest integer value and displayed on the system/kit's credit display device. While the number of credits displayed by the display device remains above zero, the customer may transfer credits from the account to the amusement device by pressing the system/kit's button. In one embodiment, one credit is transferred per button press. In alternative embodiment, more than one credit will be accepted at a time.

Figure 3:
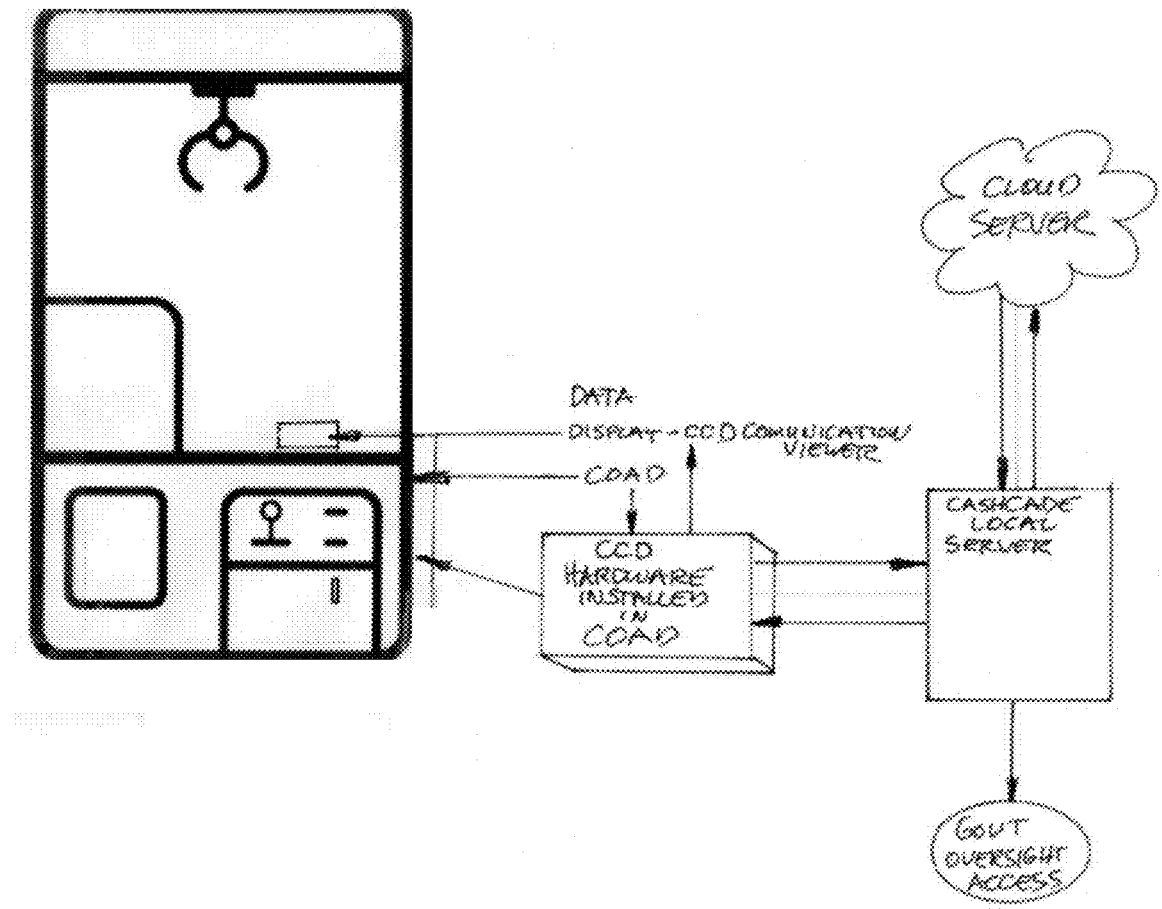
FIG. 3 is an illustration of the physical components of the system taught by the present invention for reformulating coin operated amusement devices into a deeply regulated casino cash-based rewards environment.

Technical information required and taught by the present invention for retrofitting COADs includes: a Physical interface to game meters (voltage, pulse length, timing, connectors, and pin-outs); Data being collected and needs to be stored; WiFi enabled or hardwired; Redundancy solutions/ Can the software be run in the cloud or on-site; If on-site, will duplicate servers be required; Will RAID arrays (Redundant Array of Independent Disks) be required; Remote monitoring/Establishing a secure internet connection; Update on games selected for exhibit; Front-end/back-end system rendering and description FIG. 3 is an illustration of the physical components of the system taught by the present invention for reformulating coin operated amusement devices into a deeply regulated casino cash-based rewards environment. Here a claw machine is represented as having been retrofitted with the hardware and software taught by the present invention to enable the amusement game to confirm to the deeply regulated casino cash-based rewards environment. Each COAD machine is outfitted with a Control Device (more commonly referred to as a "CD"). The CD will operate independently from the COAD to recalculate an Amusement/redemption machines ticket/Prize rewards and reformulate the existing rewards data into a cash-based reward meeting specific regulatory mandated requirements. A data display is also retrofitted to the COAD to provide a convenient view for the subscriber/user to view their credits and other information. The CD communicates with a local server. The local server communicates with a cloud server and enables government oversight by providing additional electronic access to the local server, CD, and cloud server running the system software.

The CD will receive all patron monetary, play and win data thru any one of the Coin Operated Amusement devices various analog, RS 232, MDB, CCTalk port configurations and reprocess that data in digital format thru various proprietary encrypted algorithms resulting in a cash-based reward.

The CD device will independently communicate each COAD's player results directly to the server or servers as well as simultaneously allowing the processing and recalculation of all monetary transactions between the player and the COAD. These monetary transactions are accomplished thru various identifying technologies including but not limited to Magnetic strip, RFID, Computer Applications and Bluetooth technologies. The server will meet all jurisdictional requirements to communicate in mandated SAS/GSA casino protocol standards with or without encryption.

The onset of game play will be first accomplished thru an independent kiosk housing the necessary technology to accomplish server, credit card and or application payment capabilities as well as a point of data acquisition. The system will be operationally compatible with any and all available social platforms as well provide data as to create independent contests, loyalty programs or to further the venues popularity.

The scope of our CD device will be comprised of (but not limited to) the following technical components and features. A Broad based CPU; Ram, SRam, EEProm; Data connections established to and from the CD, COAD and the server will include but not be limited to USB, DIN, Molex, RS232, HDMI, Ethernet as well as WIFI and Bluetooth; Display outputs (Multiple) including touch screen; Stereo audio outputs (Multiple); Camera ports (Still and Video); Multiple channel inputs which include opto-isolation features; SD memory card storage; Multiple additional encoding/decoding/graphics hardware components; and Proprietary operating/communication software Systems of the invention are to allow the operation of coin operated Skill based arcade games also referred to as (COADs) in a highly regulated casino environment. Skill based games may consist of but not limited to amusement type instant win, video, ball throwing, augmented virtual reality, or otherwise.

The COAD's primary play will be consistent with amusement industry skill based standards but may additionally contain 'Bonus' rewards that may be accomplished thru a random number generation process.

One embodiment includes the skill based machines game play be monitored thru a proprietary hardware device or control device (CD) which, thru various adjustable algorithms and data conversions the CD has the ability to reformulate each individual COAD's financial results to conform with regulatory minimum returns to the player.

Each CD will monitor the individual COAD game play results in a live environment and communicate the reformulated Price/reward/win results of each play to a systems video display.

Most if not all Coin operated amusement devices consist of elementary electronic operating systems incapable of communicating in protocols consistent in the Casino industry. The CD will receive and communicate all individual patron monetary, play and win data thru any one of the Coin Operated Amusement devices various analog, RS 232, MDB, CCTalk port configurations and thru various encryption processes, transmit that play data to CashCade server allowing that play to conform to regulatory standards.

As Skill based arcade games can sometimes be 'Mastered' by the player, the CashCade server will monitor and thru proprietary software reformulate the individual COAD results to meet regulated taxation's standards of play and player monetary returns.

The process of game play will begin at a Kiosk/terminal referred to as a (CST). The primary monetary transactions and player identifications are accomplished thru various identifying technologies including but not limited to Magnetic strip, RFID, Computer Applications and Bluetooth technologies.

At the point of the individual player's decision to redeem his rewards, he or she will revert back to the CST to redeem his rewards in cash. The CST will meet all jurisdictional requirements to communicate in mandated SAS/GSA casino protocol standards with or without encryption.

Figure 4:
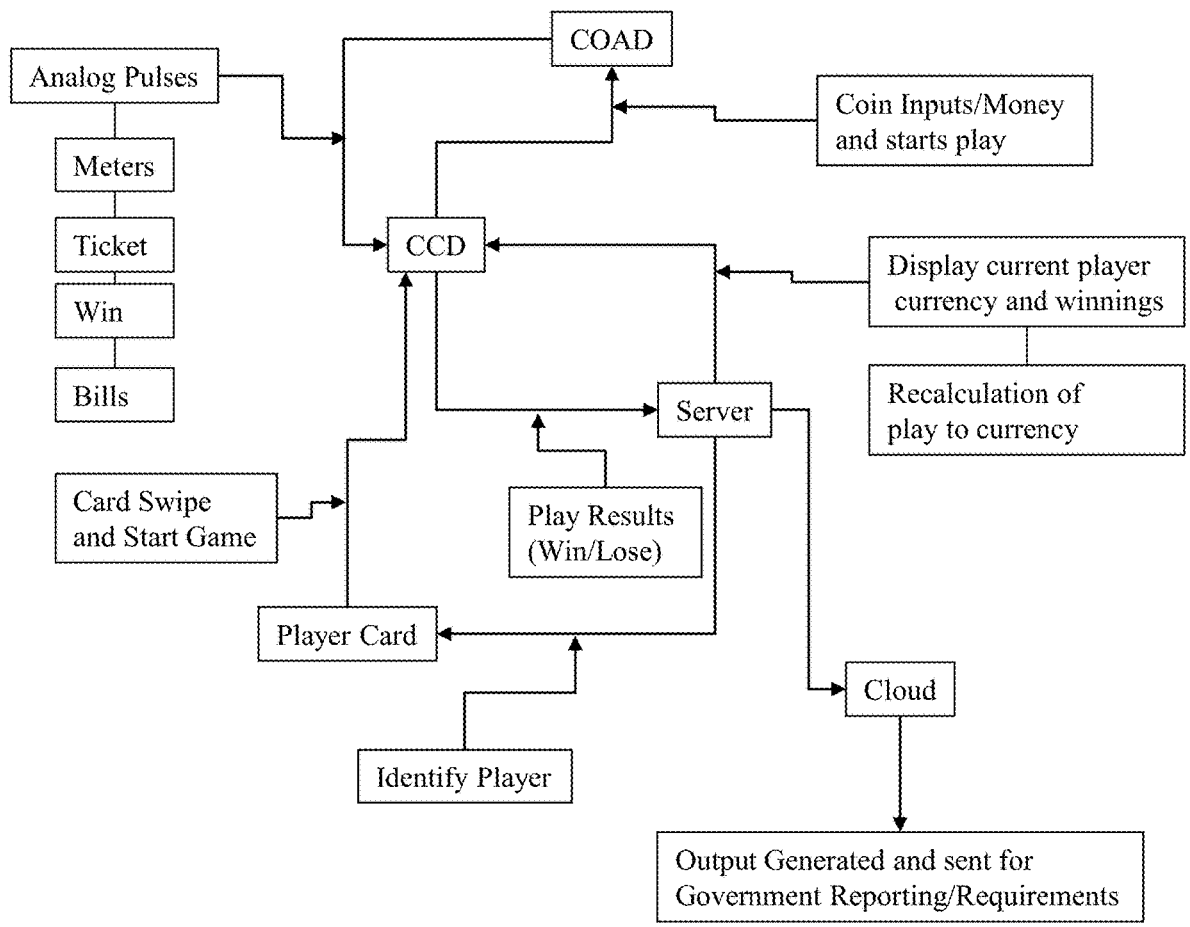
FIG. 4 is a flow chart illustrating the software process method and information flow taught by the present invention for reformulating coin operated amusement devices into a deeply regulated casino cash-based rewards environment.

FIG. 4 is a flow chart illustrating the software process method and information flow taught by the present invention for reformulating coin operated amusement devices into a deeply regulated casino cash-based rewards environment.

To start a game, a subscriber/user first swipes a card. The CD receives information form the player's card and enables game play on the COAD. The CD measures the analog pulses of the COAD with respect to metering, ticket/wins, and bill/cash valuations for redemption. The COAD can also accept currency and/or coins to start a play. The CD communicates with a cloud system server to identify players using cards, report and display a current player's currency and winnings as well as determining/recalculating of play/winnings to currency. The system server tracks play results and the win/lose percentage of a player and each COAD reporting via a CD. The system server then reports this to the systems cloud server, which can communicate the results and metrics to a government computer for regulatory compliance.

The system and method of the present invention is set to run on one or more computing devices, mobile electronic devices, or a combination thereof. A computing device or mobile electronic device on which the present invention can run would be comprised of a CPU, storage device, keyboard, monitor or screen, CPU main memory and a portion of main memory where the system resides and executes. Any general-purpose computer, smartphone, or other mobile electronic device with an appropriate amount of storage space is suitable for this purpose. Computer and mobile electronic devices like these are well known in the art and are not pertinent to the invention. The system can also be written in several different languages and run on a number of different operating systems and platforms.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A system for retrofitting a ticket redemption arcade device that was originally incapable of communicating in protocols consistent with a regulated casino cash-based rewards environment into a retrofitted ticket redemption arcade device that is capable of communicating in protocols consistent with the regulated casino cash-based rewards environment, the system comprising:
   an interface device configured to connect to the retrofitted ticket redemption arcade device, wherein the interface device comprises:
      a network connection for communication with components of the system;
      a card reader for accessing a player account including game credits;
      a display device for displaying the game credits available on the player account for playing the retrofitted ticket redemption arcade device;

an input device for player interaction to transfer at least some of the game credits from the player account to the retrofitted ticket redemption arcade device; and an activation interface to initiate gameplay by redeeming at least some of the game credits;

an analog/digital board connected to the retrofitted ticket redemption arcade device and the interface device, wherein the analog/digital board collects and records meter data from the retrofitted ticket redemption arcade device, intercepts ticket pulses, and adds value to the player account by monitoring individual game performance and reformulating computer player data into cash-based rewards that may be withdrawn by the player;

a control device connected with the analog/digital board and the interface device to receive and transmit information to and from the analog/digital board and the card reader;

a remote cloud computer system to store system and business logic; and a local server connected with the control device to communicate with the remote cloud server to enable government oversight by providing government electronic access to the local server for compliance and reporting purposes using SAS/GSA casino protocol standards.

* * * * *